US011593263B2

(12) United States Patent
Khan et al.

(10) Patent No.: US 11,593,263 B2
(45) Date of Patent: Feb. 28, 2023

(54) TECHNOLOGIES TO ADDRESS INDIVIDUAL BITS IN MEMORY

(71) Applicant: Intel Corporation, Santa Clara, CA (US)

(72) Inventors: Jawad B. Khan, Portland, OR (US); Richard Coulson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 76 days.

(21) Appl. No.: 16/367,321

(22) Filed: Mar. 28, 2019

(65) Prior Publication Data

US 2019/0220400 A1 Jul. 18, 2019

(51) Int. Cl.
*G06F 12/06* (2006.01)
*G06F 12/02* (2006.01)

(52) U.S. Cl.
CPC .......... *G06F 12/06* (2013.01); *G06F 12/0207* (2013.01); *G06F 12/0238* (2013.01); *G06F 2212/1041* (2013.01); *G06F 2212/1044* (2013.01); *G06F 2212/454* (2013.01)

(58) Field of Classification Search
CPC ............. G06F 12/0207; G06F 12/0238; G06F 12/0292; G06F 12/06; G06F 2212/1041; G06F 2212/1044; G06F 2212/454; G06F 2212/7201
See application file for complete search history.

(56) References Cited

U.S. PATENT DOCUMENTS

| | | | | |
|---|---|---|---|---|
| 2007/0171710 A1* | 7/2007 | Mito | .................. | G11C 16/0466 365/185.03 |
| 2011/0072205 A1* | 3/2011 | Lee | ........................ | G11C 29/08 711/105 |
| 2011/0107055 A1* | 5/2011 | Shepard | .............. | G06F 12/0207 711/200 |
| 2014/0027515 A1* | 1/2014 | Simske | .................. | G06Q 50/00 235/454 |
| 2018/0301188 A1* | 10/2018 | Choi | ...................... | G11C 5/066 |
| 2019/0146717 A1 | 5/2019 | Khan et al. | | |

* cited by examiner

*Primary Examiner* — Aracelis Ruiz
(74) *Attorney, Agent, or Firm* — Compass IP Law PC

(57) ABSTRACT

Technologies for addressing individual bits in memory include a device having a memory that includes partitions that each have tiles, in which each tile stores an individual bit. The device also includes circuitry to receive a request to access (e.g., read or write) a sequence of bits in a partition. The request specifies a logical row or column address. A corresponding tile is determined from the logical row or column address and for each bit in the sequence. The corresponding tile is accessed to read or write the bit therein.

20 Claims, 5 Drawing Sheets

TECHNOLOGIES TO ADDRESS INDIVIDUAL BITS IN MEMORY

BACKGROUND

Memory matrix operations have multiple applications in various settings, such as in the fields of artificial intelligence and machine learning. In such operations, a device may manipulate data in rows and columns. Performing a matrix multiplication involves reading a given matrix in row-major form, reading another matrix in column-major form, and multiplying the respective rows and columns with one another. And in such a case, the result of such operations generally yields a fixed-size multiple-bit data structure, such as an addressable byte, word, etc. In some scenarios, it may be desirable to read data in a more granular size.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
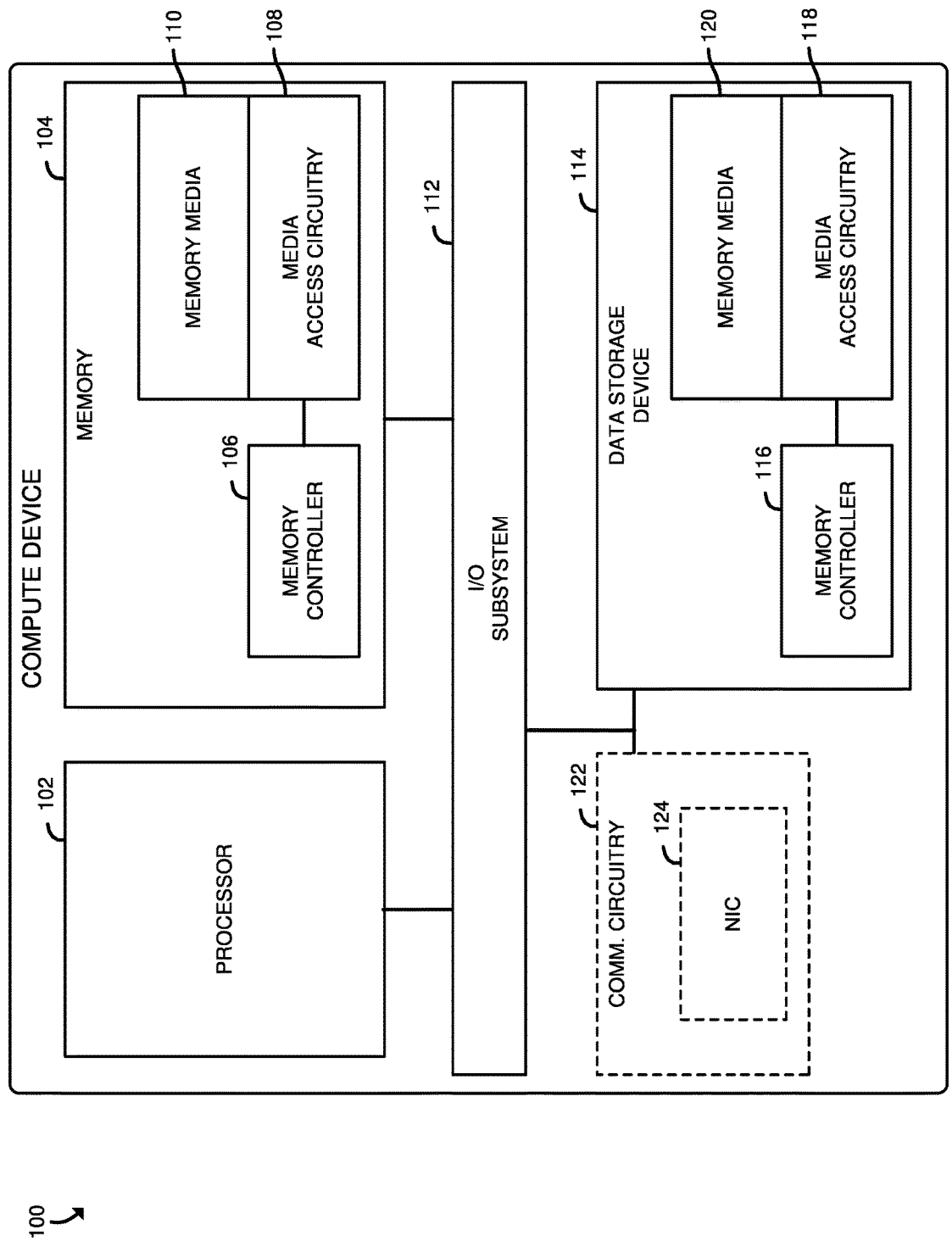
FIG. 1 is a simplified block diagram of at least one embodiment of an example compute device to individually address bits of data in a memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for accessing individually addressed bits in memory includes a processor 102, memory 104, an input/output (I/O) subsystem 110, a data storage device 114, and communication circuitry 122. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As further described herein, the compute device 100, and in particular, the memory of the compute device 100 allows bits of data to be individually addressable. More particularly, the memory may be implemented as a three-dimensional cross-point architecture embodied as a set of tiles that are each addressable by an x parameter and a y parameter (e.g., a column and a row). Each tile represents a single bit of data (e.g., a 0 or a 1). Further, a set of tiles form a partition, and multiple partitions may be logically stacked to form the three-dimensional cross-point architecture.

The processor 102 may be embodied as any device or circuitry (e.g., a multi-core processor(s), a microcontroller, or other processor or processing/controlling circuit) capable of executing a workload (e.g., a set of operations, such as an application that may produce requests to read from and/or write to sections of memory, such as selected columns and/or rows of data in a matrix) and/or performing other operations described herein. In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes a memory media 110 and media access circuitry 108 (e.g., a device or circuitry, such as integrated circuitry constructed from complementary metal-oxide-semiconductors (CMOS) or other materials) underneath the memory media 110. The media access circuitry 108 is also connected to a memory controller 106, which may be embodied as any device or circuitry (e.g., a processor, a co-processor, dedicated circuitry, etc.) configured to selectively read from and/or write to the memory media 110 (e.g., in response to requests from the processor 102, which may be executing an application seeking to read from or write to the memory media 110). Referring briefly to FIG. 6, the memory media 110, in the illustrative embodiment, includes a set of tiles 610, 612, 614, 616, 618, 620, 622, 624, 626, 628, 630, 632, 634, 636, 638, 640 (e.g., each an addressable section of the memory media 110 capable of retaining data) arranged in a cross point architecture (e.g., an architecture in which memory cells sit at the intersection of word lines and bit lines and are individually addressable and in which bit storage is based on a change in bulk resistance), in which each tile is addressable by an x parameter and a y parameter (e.g., a column and a row). A set of tiles form a partition and multiple partitions may be stacked as layers 602, 604, 606 to form a three-dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

In the illustrative embodiment, the media access circuitry 108 defines logical rows and logical columns in which each bit maps to a tile in a given partition and can be addressed individually, allowing data structures of variable lengths to be accessed. For instance, the media access circuitry 108 may receive a request (e.g., from the memory controller 106) to read a data structure (e.g., a sequence of bits) of an arbitrary size. In response, the media access circuitry 108 may individually address (e.g., read the value of) each bit from the memory media 110 and concatenate the read values to form a data structure of the requested size. Further, the media access circuitry 108 may write a data structure of an arbitrary size (e.g., a data structure of any number of bits specified by the memory controller 106) to the memory media by individually writing data to each corresponding tile (e.g., bit) in the memory media 110. Individually addressing bits in the memory media 110 provides for greater flexibility for data access compared to conventional memory devices that use fixed-size multiple-bit data structures. Further, doing so allows workloads accessing the memory media 110 to retrieve data in both row-major and column-major form, eliminating intermediary memory matrix transpose operations, such as during column access.

The main memory 104 may also include as various types of volatile or non-volatile memory or data storage capable of performing the functions described herein. More particularly, the non-volatile memory may be embodied as any type of data storage capable of storing data in a persistent manner, even if power is interrupted to non-volatile memory. The non-volatile memory can include one or more memory devices configured in a cross-point architecture that enables bit-level addressability (e.g., the ability to read from and/or write to individual bits of data rather than bytes or other units of data) and may be embodied as three-dimensional (3D) crosspoint memory. In some embodiments, the non-volatile memory may additionally include other types of memory, including any combination of memory devices that use chalcogenide phase change material (e.g., chalcogenide glass), ferroelectric transistor random-access memory (FeTRAM), nanowrite-based non-volatile memory, phase change memory (PCM), memory that incorporates memristor technology, magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114, may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, media access circuitry 118, similar to the media access circuitry 108, and memory media 120, similar to the memory media 110. As such, in the illustrative embodiment, the data storage device 114 is capable of efficiently accessing (e.g., reading and/or writing to) selected rows and columns of data (e.g., in a multi-dimensional matrix) in the memory media 120. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 122, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 2:
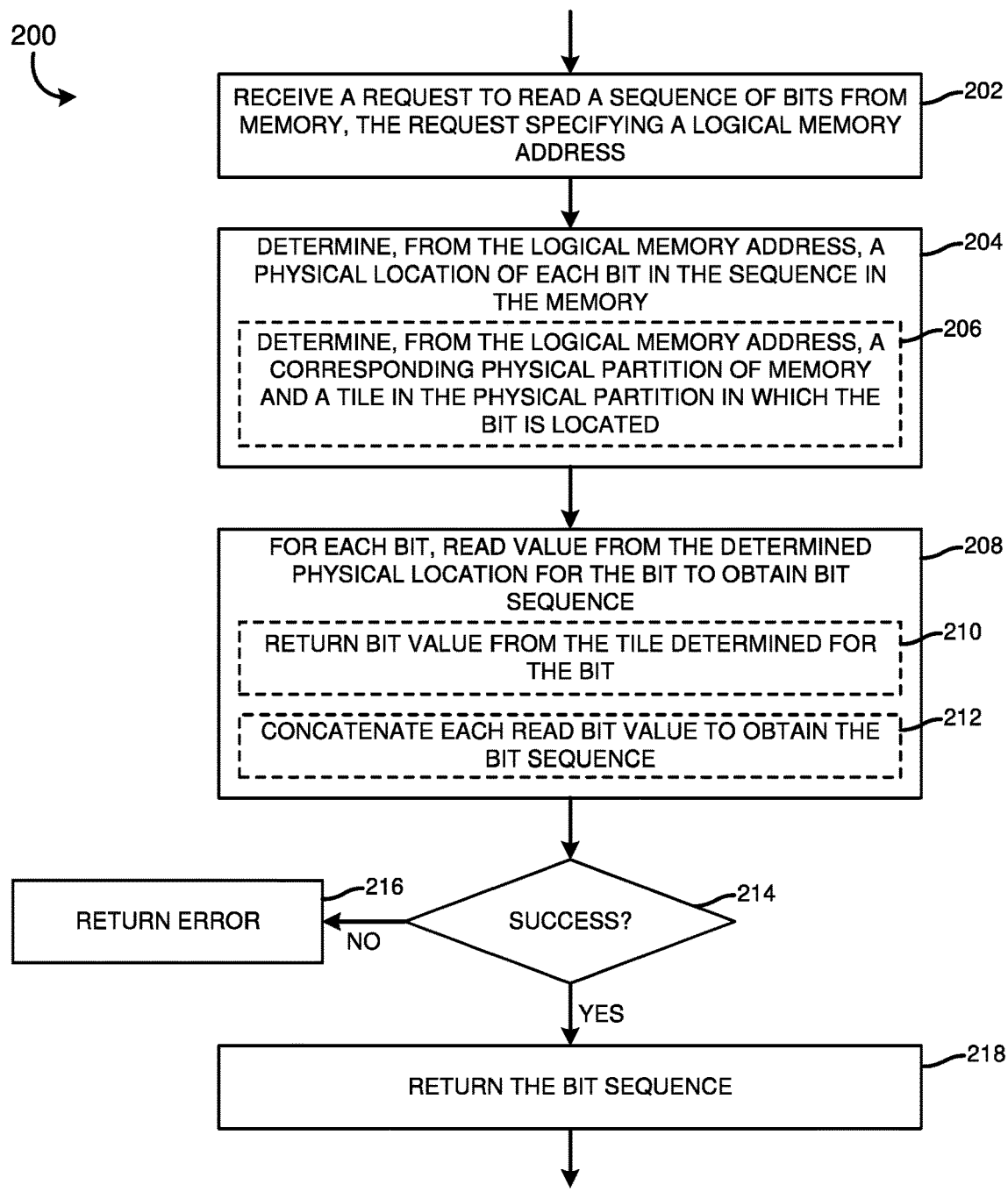
FIG. 2 is a simplified diagram of at least one embodiment of a method for reading individually addressed bits from memory.

Referring now to FIG. 2, the compute device 100, in operation, may perform a method 200 for reading individually addressable bits from memory. In this example, the method 200 is described relative to the memory 104. However, one of skill in the art will recognize that the method 200 can be additionally or alternatively performed using the memory of the data storage device 114.

As shown, the method 200 begins in block 202, in which the compute device 100 receives a request to read a sequence of bits from memory. In some embodiments, the request may originate from an application executed by the processor 102. Further, the sequence of bits may correspond to a data structure of an arbitrary size, in which the size can be specified in the request. Further still, the request may also specify a logical memory address indicative of a location in the memory in which the bit sequence is stored. The logical memory address may be indicative of a logical row or column corresponding to locations in a memory matrix in which each bit of the sequence is stored.

In block 204, the compute device 100 determines, from the logical memory address, a physical location of each bit in the sequence in the memory. More particularly, in block 206, the compute device 100 determines, from the logical memory address, a corresponding physical partition of memory and a tile in the partition in which the bit is located. For instance, the compute device 100 may include a mapping table that maps the logical memory address to a given location in the physical memory. The compute device 100 may reference the table to obtain the corresponding tile.

In block 208, the compute device 100, for each bit, reads a value from the respective physical location (e.g., a corresponding tile) for the bit to obtain the bit sequence. More particularly, in block 210, the compute device 100 returns a bit value from the tile that corresponds to the logical address for that bit. Once each bit in the requested sequence is read, then in block 212, the compute device 100 may concatenate the read bit value to obtain the bit sequence. In block 214, the compute device 100 determines whether the read operation on the sequence of bits was successful. For example, the compute device 100 may determine whether any of the read attempts to a given tile was unsuccessful or determine whether the request was valid. If not, then in block 216, the compute device 100 may return an error. Otherwise, in block 218, the compute device 100 returns the bit sequence to the requestor (e.g., a requesting application, the memory controller 106 or 116, etc.). The bit sequence may form a data structure usable by the requestor.

Figure 3:
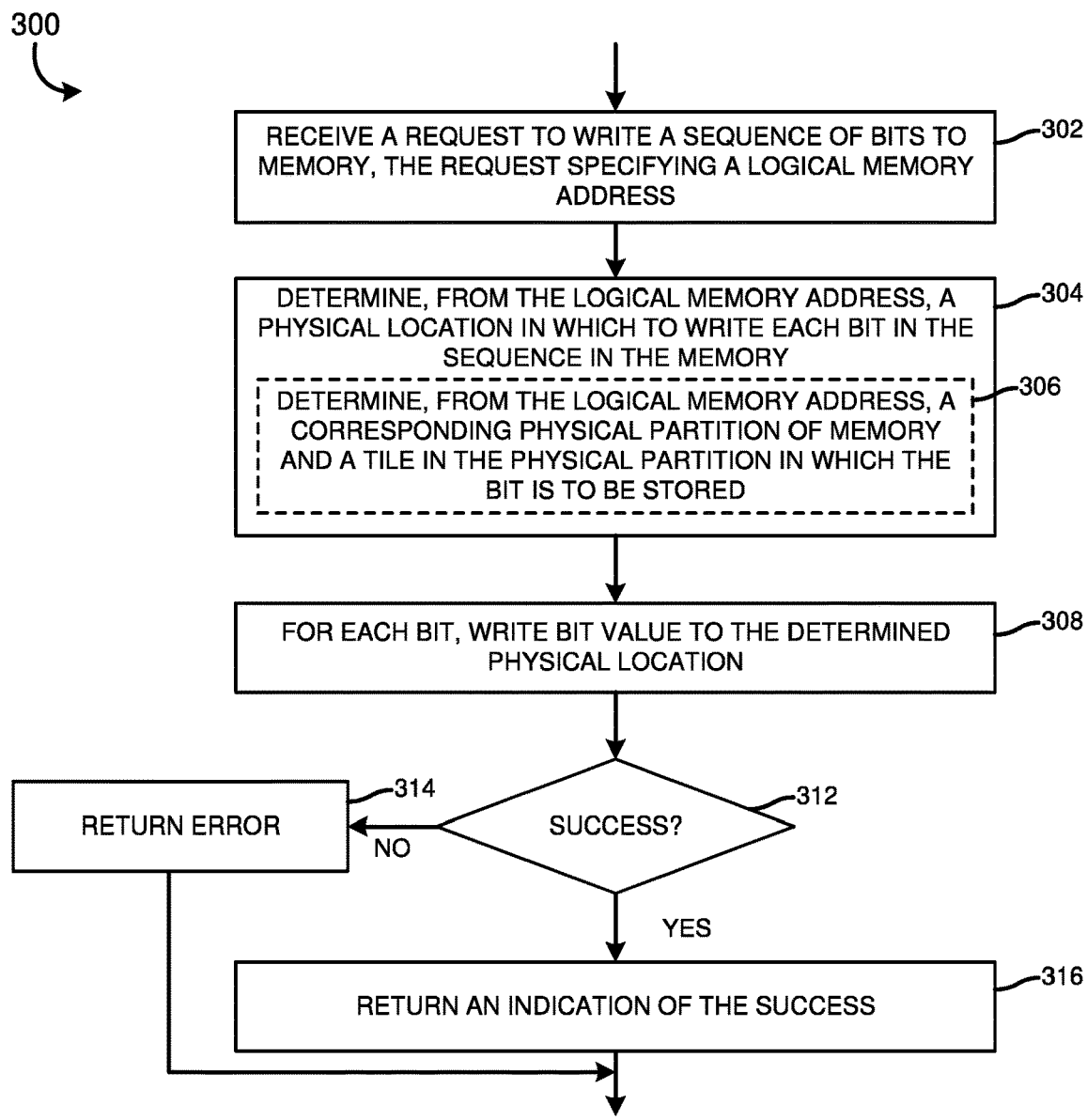
FIG. 3 is a simplified diagram of at least one embodiment of method for writing individually addressed bits to memory.

Referring now to FIG. 3, the compute device 100, in operation, may perform a method 300 for writing individually addressable bits to memory. In this example, the method 300 is described relative to the memory 104. However, one of skill in the art will recognize that the method 300 can be additionally or alternatively performed using the memory of the data storage device 114.

As shown, the method 300 begins in block 302, in which the compute device 100 receives a request to write a sequence of bits to memory. In some embodiments, the request may originate from an application executed by the processor 102. Further, the sequence of bits may correspond to a data structure of an arbitrary size, in which the size can be specified in the request. Further still, the request may also specify a logical memory address indicative of a location in the memory in which to write the bit sequence. The logical memory address may be indicative of a logical row or column corresponding to locations in a memory matrix in which each bit of the sequence is to be stored.

In block 304, the compute device 100 determines, from the logical memory address, a physical location of each bit in the sequence in the memory. More particularly, in block 306, the compute device 100 determines, from the logical memory address, a corresponding physical partition of memory and a tile in the partition in which the bit is to be stored. For instance, the compute device 100 may include a mapping table that maps the logical memory address to a given location in the physical memory. The compute device 100 may reference the table to identify the corresponding tile.

In block 308, the compute device 100, for each bit, writes a value (specified in the request) to the respective physical location (e.g., a corresponding tile). In block 310, the compute device 100 may then determine whether the writing of each bit to the respective corresponding tile was successful. If not, then in block 312, the compute device 100 may return an error to the requesting application, e.g., via the memory controller 106 (or 116). Otherwise, in block 314, the compute device 100 may return an indication of success to the application.

Figure 4B:
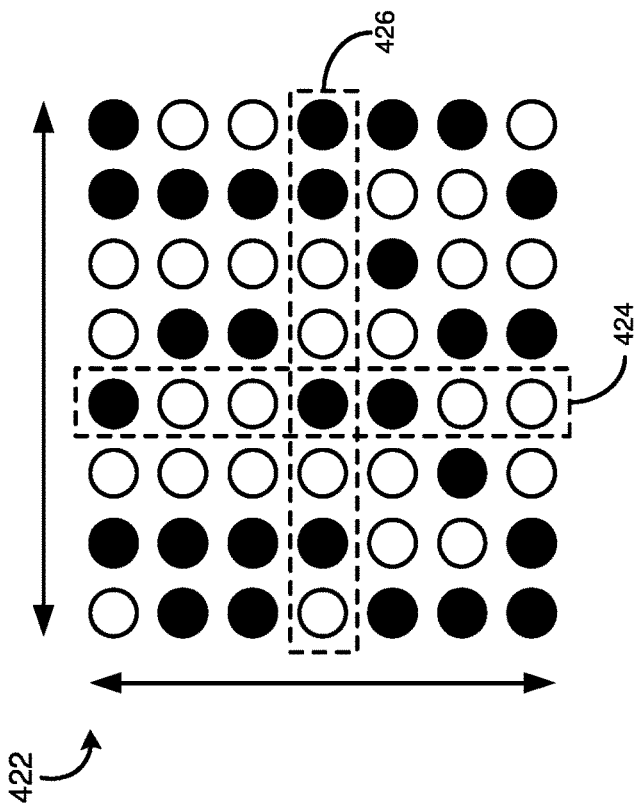
FIGS. 4A and 4B are simplified conceptual diagrams of at least one embodiment of a cross-point architecture in which memory cells are positioned at intersections of word lines and bit lines and are individually addressable.
Figure 4A:
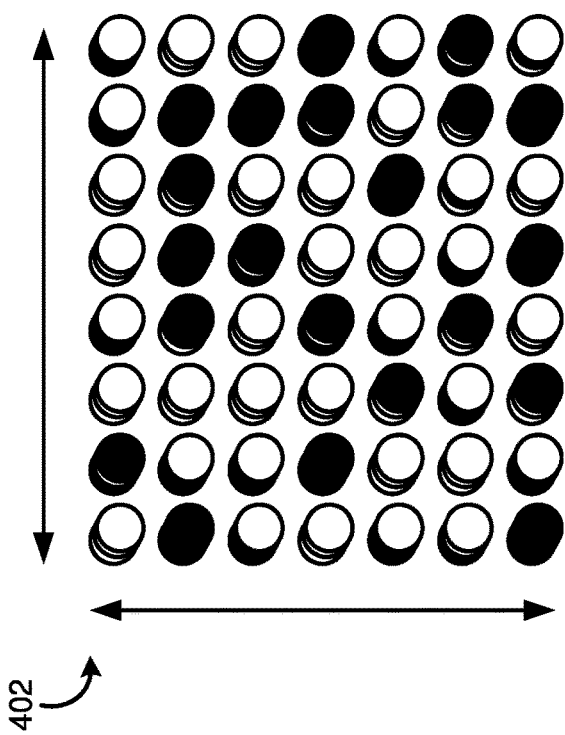

Referring now to FIGS. 4A and 4B, conceptual diagrams of the layout of a cross-point architecture in which memory cells are individually addressable are shown. As noted, the compute device 100 may be representative of a 3D cross-point memory-based storage device that, instead of using word-lines and bit-lines for page data, uses bit-addressable memory units.

FIG. 4A illustrates a diagram 402 depicting multiple partitions stacked atop another to provide a cross-point architecture in which each partition provides a row and column layout, as indicated by the two-way arrows in the horizontal and vertical direction. The diagram 402 shows that multiple units of access may be obtainable through such an arrangement. More specifically, because each bit is addressable by tile (depicted herein as dots, in which black dots are indicative of matrix cells that are occupied, e.g., have a value of 1, and in which white dots are indicative of matrix cells that are unoccupied, e.g., have a value of 0), an application may address individual bits, bytes, words, and the like. For example, the application may issue a request to the memory that references a particular partition as well as a logical row or column (e.g., x and y addresses) associated with the partition. Such flexibility allows the application to define data structures of an arbitrary size for storage and retrieval in the memory. Note, although the embodiments disclosed herein describe a matrix cell having either a value of 0 or a 1, it is possible for other values to be stored therein.

FIG. 4B illustrates a conceptual diagram of matrix data 422 associated with a given partition. As stated with respect to the partitions of diagram 402, in the matrix data 422, the memory units are represented as dots, in which black dots are indicative of matrix cells that are occupied and in which white dots are indicative of matrix cells that are unoccupied.

Illustratively, a column selection 424 is shown in which output from a read-out of the column selection 424 corresponds to data from each row in the matrix along the column. The output is indicative of portions of data for a page read from the compute device 100. Further, a row selection 426 is shown in which output from a read-out of the row selection 426 corresponds to data from each column in the matrix along the row. The output is indicative of portions of data for a page read from the compute device 100. As a result, data may be read directly in either row-major or column-major format. By specifying whether the data is to be read (or written to) in row-major or column-major form, the memory can provide primitives for matrix-matrix and matrix-vector operations. In addition, read-out of individual bits allows the compute device 100 to perform read operations in an arbitrary manner, such as by performing diagonal read operations in the matrix.

Figure 5:
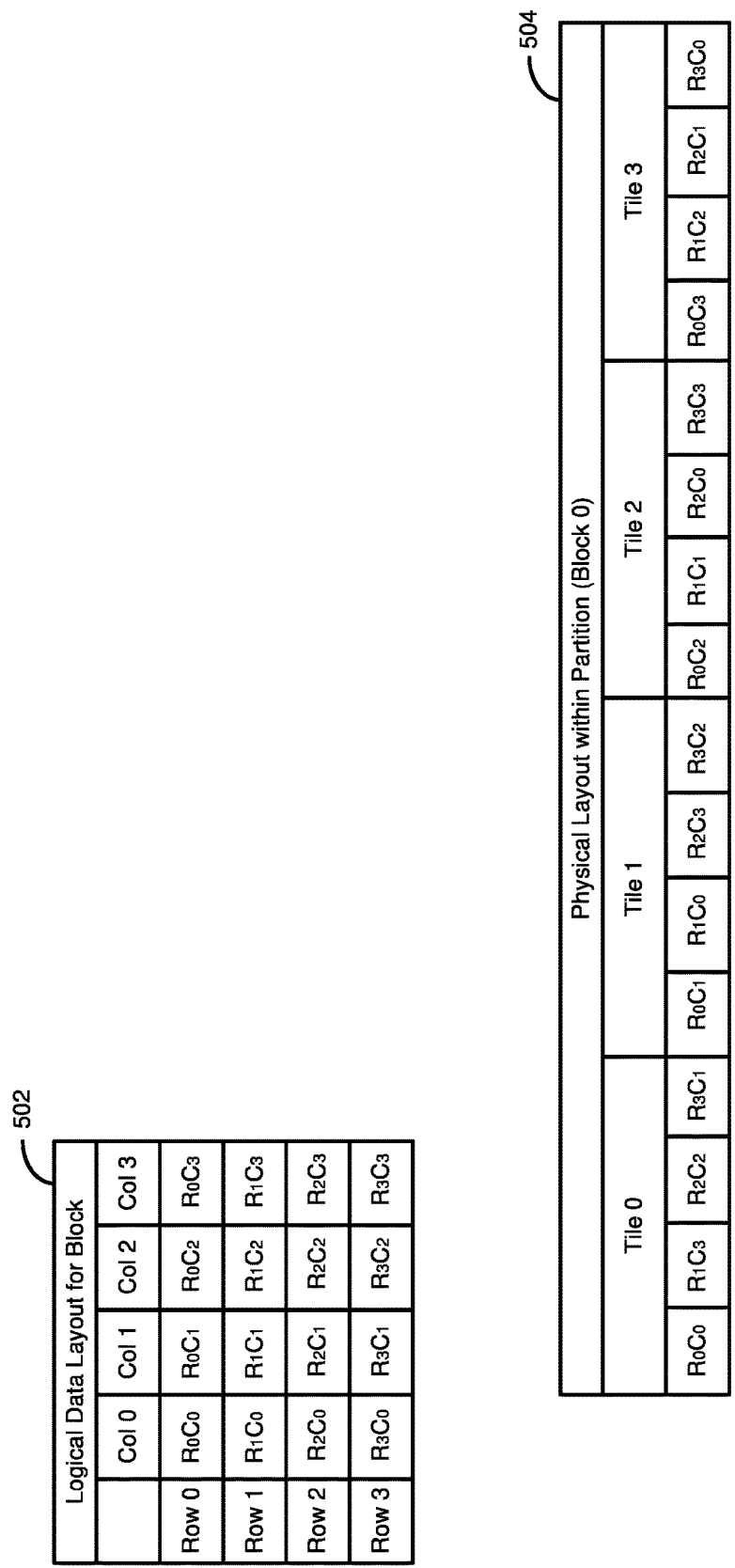
FIG. 5 is a simplified conceptual diagram of logical and physical layouts of data that may be used by the compute device of FIG. 1.

Referring now to FIG. 5, a conceptual diagram for a placement of bits of data in a three-dimensional cross-point architecture memory is shown. More particularly, the diagram depicts an example of a logical layout 502 and a corresponding physical layout 504 of data within the memory media 110. Illustratively, the logical layout 502 illustrates rows 0-3 and columns 0-3 that correspond to positions in block 0 of the physical layout 504. Of course, the logical layout 502 may include additional rows and columns. Further, each data bit in the logical layout 502 is associated with a row value and a column value based on the position within the layout 502, e.g., $R_0C_0, R_0C_1, R_0C_2, R_0C_3$ for row 0, $R_0C_0, R_1C_0, R_2C_0, R_3C_0$ for column 0, and so on.

As shown, each bit in the logical layout 502 maps to a location in a corresponding tile in block 0 of the physical layout 504. For example, for row 0, the bit in $R_0C_0$ maps to tile 0, $R_0C_1$ maps to tile 1, $R_0C_2$ maps to tile 2, $R_0C_3$ maps to tile 3, and so on. Consequently, a request to access data in a particular logical bit address results in the media access circuitry 108 returning an individual bit value from one of the tiles in the physical layout 504. In this example, assume that an application requests to read a bit in row 1 and column 3 of the logical layout 502. In such a case, the media access circuitry 108 may identify the logical address of the corresponding bit mapping to tile 0. The media access circuitry 108 may retrieve the bit value from the tile 0 and return the value to the application.

EXAMPLES

Illustrative examples of the technologies disclosed herein are provided below. An embodiment of the technologies may include any one or more, and any combination of, the examples described below.

Example 1 includes an apparatus comprising a memory comprising a plurality of partitions, each partition having a plurality of tiles, each tile to store an individual bit; and a circuitry to receive a request to read or write a sequence of a bits in a first partition of the plurality of partitions, wherein the request specifies a logical row or column address; determine, from the logical row or column address and for each bit in the sequence, a corresponding tile of the plurality of tiles in the first partition, wherein each tile of the plurality of tiles includes a plurality of locations; and access, for each bit in the sequence, the corresponding tile to read or write the bit therein.

Example 2 includes the subject matter of Example 1, and wherein to receive the request comprises to receive a request to read or write the sequence of bits in the memory, wherein the memory is of a cross-point architecture in which memory cells are positioned at intersections of word lines and bit lines and are individually addressable.

Example 3 includes the subject matter of any of Examples 1 and 2, and wherein to receive the request comprises to receive a request to read or write the sequence of bits in the memory, wherein the memory is of a three-dimensional cross-point architecture.

Example 4 includes the subject matter of any of Examples 1-3, and wherein to access, for each bit in the sequence, the corresponding tile comprises to read a value from the corresponding tile for each bit; and concatenate each read value to obtain the sequence of bits.

Example 5 includes the subject matter of any of Examples 1-4, and wherein to access, for each bit in the sequence, the corresponding tile comprises to write a value of each bit to the corresponding tile respectively.

Example 6 includes the subject matter of any of Examples 1-5, and wherein the circuitry is further to return the bit sequence.

Example 7 includes the subject matter of any of Examples 1-6, and wherein to determine, from the logical row or column address and for each bit in the sequence, the corresponding tile comprises to determine a physical row and a physical column address in the first partition based on the logical row or column address.

Example 8 includes a compute device comprising a data storage device comprising a memory comprising a plurality of partitions, each partition having a plurality of tiles, each tile to store an individual bit, and a memory controller to receive a request to read or write a sequence of a bits in a first partition of the plurality of partitions, wherein the request specifies a logical row or column address, determine, from the logical row or column address and for each bit in the sequence, a corresponding tile of the plurality of tiles in the first partition, wherein each tile of the plurality of tiles includes a plurality of locations, and access, for each bit in the sequence, the corresponding tile to read or write the bit therein.

Example 9 includes the subject matter of Example 8, and wherein to receive the request comprises to receive a request to read or write the sequence of bits in the memory, wherein the memory is of a cross-point architecture in which memory cells are positioned at intersections of word lines and bit lines and are individually addressable.

Example 10 includes the subject matter of any of Examples 8 and 9, and wherein to receive the request comprises to receive a request to read or write the sequence of bits in the memory, wherein the memory is of a three-dimensional cross-point architecture.

Example 11 includes the subject matter of any of Examples 8-10, and wherein to access, for each bit in the sequence, the corresponding tile comprises to read a value from the corresponding tile for each bit; and concatenate each read value to obtain the sequence of bits.

Example 12 includes the subject matter of any of Examples 8-11, and wherein to access, for each bit in the sequence, the corresponding tile comprises to write a value of each bit to the corresponding tile respectively.

Example 13 includes the subject matter of any of Examples 8-12, and wherein the memory controller is further to return the bit sequence.

Example 14 includes the subject matter of any of Examples 8-13, and wherein to determine, from the logical row or column address and for each bit in the sequence, the corresponding tile comprises to determine a physical row and a physical column address in the first partition based on the logical row or column address.

Example 15 includes a device comprising a memory comprising a plurality of partitions, each partition having a plurality of tiles, each tile to store an individual bit; circuitry for receiving a request to read or write a sequence of a bits in a first partition of the plurality of partitions, wherein the request specifies a logical row or column address; means for determining, from the logical row or column address and for each bit in the sequence, a corresponding tile of the plurality of tiles in the first partition, wherein each tile of the plurality of tiles includes a plurality of locations; and means for accessing, for each bit in the sequence, the corresponding tile to read or write the bit therein.

Example 16 includes the subject matter of Example 15, and wherein the circuitry for receiving the request comprises circuitry for receiving a request to read or write the sequence of bits in the memory, wherein the memory is of a cross-point architecture in which memory cells are positioned at intersections of word lines and bit lines and are individually addressable.

Example 17 includes the subject matter of any of Examples 15 and 16, and wherein the circuitry for receiving the request comprises circuitry for receiving a request to read or write the sequence of bits in the memory, wherein the memory is of a three-dimensional cross-point architecture.

Example 18 includes the subject matter of any of Examples 15-17, and wherein the means for accessing, for each bit in the sequence, the corresponding tile comprises circuitry for reading a value from the corresponding tile for each bit; and circuitry for concatenating each read value to obtain the sequence of bits.

Example 19 includes the subject matter of any of Examples 15-18, and wherein the means for accessing, for each bit in the sequence, the corresponding tile comprises circuitry for writing a value of each bit to the corresponding tile respectively.

Example 20 includes the subject matter of any of Examples 15-19, and wherein the means for determining, from the logical row or column address and for each bit in the sequence, the corresponding tile comprises determining a physical row and a physical column address in the first partition based on the logical row or column address.

The invention claimed is:

1. An apparatus comprising:
    a memory comprising a plurality of partitions, each partition having a plurality of tiles, each tile to store an individual bit; and
    a circuitry to:
        receive a request to read or write a sequence of bits in a first partition of the plurality of partitions, wherein the request specifies a logical row or column address and specifies that the sequence of bits includes fewer than 8 bits;
        determine, from the logical row or column address and for each bit in the sequence, a corresponding tile of the plurality of tiles in the first partition, wherein each tile of the plurality of tiles includes a plurality of locations; and
        access, for each bit in the sequence, the corresponding tile to directly read or directly write the bit therein.

2. The apparatus of claim 1, wherein to receive the request comprises to receive a request to read or write the sequence of bits in the memory, wherein the memory is of a cross-point architecture in which memory cells are positioned at intersections of word lines and bit lines and are individually addressable.

3. The apparatus of claim 1, wherein to receive the request comprises to receive a request to read or write the sequence of bits in the memory, wherein the memory is of a three-dimensional cross-point architecture.

4. The apparatus of claim 1, wherein to access, for each bit in the sequence, the corresponding tile comprises to:
    directly read a value from the corresponding tile for each bit; and
    concatenate each read value to obtain the sequence of bits.

5. The apparatus of claim 1, wherein to access, for each bit in the sequence, the corresponding tile comprises to:
    directly write a value of each bit to the corresponding tile respectively.

6. The apparatus of claim 1, wherein the circuitry is further to return the sequence of bits.

7. The apparatus of claim 1, wherein to determine, from the logical row or column address and for each bit in the sequence, the corresponding tile comprises to:
    determine a physical row and a physical column address in the first partition based on the logical row or column address.

8. A compute device comprising:
    a data storage device comprising:
        a memory comprising a plurality of partitions, each partition having a plurality of tiles, each tile to store an individual bit, and
        a memory controller to:
            receive a request to read or write a sequence of bits in a first partition of the plurality of partitions, wherein the request specifies a logical row or column address and specifies that the sequence of bits includes fewer than 8 bits,
            determine, from the logical row or column address and for each bit in the sequence, a corresponding tile of the plurality of tiles in the first partition, wherein each tile of the plurality of tiles includes a plurality of locations, and
            access, for each bit in the sequence, the corresponding tile to directly read or directly write the bit therein.

9. The compute device of claim 8, wherein to receive the request comprises to receive a request to read or write the sequence of bits in the memory, wherein the memory is of a cross-point architecture in which memory cells are positioned at intersections of word lines and bit lines and are individually addressable.

10. The compute device of claim 8, wherein to receive the request comprises to receive a request to read or write the sequence of bits in the memory, wherein the memory is of a three-dimensional cross-point architecture.

11. The compute device of claim 8, wherein to access, for each bit in the sequence, the corresponding tile comprises to:
    directly read a value from the corresponding tile for each bit; and
    concatenate each read value to obtain the sequence of bits.

12. The compute device of claim 8, wherein to access, for each bit in the sequence, the corresponding tile comprises to:
    directly write a value of each bit to the corresponding tile respectively.

13. The compute device of claim 8, wherein the memory controller is further to return the sequence of bits.

14. The compute device of claim 8, wherein to determine, from the logical row or column address and for each bit in the sequence, the corresponding tile comprises to:
    determine a physical row and a physical column address in the first partition based on the logical row or column address.

15. A device comprising:
    a memory comprising a plurality of partitions, each partition having a plurality of tiles, each tile to store an individual bit;
    circuitry for receiving a request to read or write a sequence of bits in a first partition of the plurality of partitions, wherein the request specifies a logical row or column address and specifies that the sequence of bits includes fewer than 8 bits;

means for determining, from the logical row or column address and for each bit in the sequence, a corresponding tile of the plurality of tiles in the first partition, wherein each tile of the plurality of tiles includes a plurality of locations; and means for accessing, for each bit in the sequence, the corresponding tile to directly read or directly write the bit therein.

16. The device of claim 15, wherein the circuitry for receiving the request comprises circuitry for receiving a request to read or write the sequence of bits in the memory, wherein the memory is of a cross-point architecture in which memory cells are positioned at intersections of word lines and bit lines and are individually addressable.

17. The device of claim 15, wherein the circuitry for receiving the request comprises circuitry for receiving a request to read or write the sequence of bits in the memory, wherein the memory is of a three-dimensional cross-point architecture.

18. The device of claim 15, wherein the means for accessing, for each bit in the sequence, the corresponding tile comprises:

circuitry for directly reading a value from the corresponding tile for each bit; and circuitry for concatenating each read value to obtain the sequence of bits.

19. The device of claim 15, wherein the means for accessing, for each bit in the sequence, the corresponding tile comprises:

circuitry for directly writing a value of each bit to the corresponding tile respectively.

20. The device of claim 15, wherein the means for determining, from the logical row or column address and for each bit in the sequence, the corresponding tile comprises:

determining a physical row and a physical column address in the first partition based on the logical row or column address.

* * * * *